Patented July 20, 1954

2,684,349

UNITED STATES PATENT OFFICE 2,684,349

SILICONE RUBBER HAVING IMPROVED FLAME-RETARDANT PROPERTIES

John J. Whelton, Schenectady, N. Y., assignor to General Electric Company, a corporation of New York No Drawing. Application December 17, 1952, Serial No. 326,583

12 Claims. (Cl. 260—37)

This invention is concerned with organopolysiloxanes having improved flame-retardant properties. More particularly, the invention is concerned with a hydrocarbon-substituted polysiloxane convertible by heat to the solid, elastic, substantially infusible and insoluble state, the aforesaid polysiloxanes having improved flame-retardant properties as a result of the incorporation therein of a minor proportion of finely divided glass.

Heat-converted solid elastic organopolysiloxanes (for brevity hereinafter referred to as "silicone rubbers") are known to have good heat resistance at elevated temperatures which are much higher than the temperatures which usual natural and synthetic rubbers can withstand. However, in certain applications, particularly in coacting applications, it has been found that these silicone rubbers, at temperatures encountered by direct contact with an open flame, do not have the desired flame retardancy properties which some applications may require. Due to the presence of organic groups in the organopolysiloxane structure, once the flame is applied to the silicone rubber, even though it is filled with an inorganic filler, the silicone rubber will continue to burn unless extinguished by external means.

I have now discovered that I am able to improve the flame-retardant properties of silicone rubber by incorporating therein varying amounts, for instance, from about 5 to 100 per cent, by weight, based on the weight of the convertible organopolysiloxane, of a low melting glass, advantageously in the form of a finely divided frit. By means of the incorporation of minor amounts of the glass frit, I am able to greatly improve the flame retardant properties of the silicone rubber. In the absence of the finely divided glass frit, the silicone rubber generally will burn, even though there is present in the silicone rubber a relatively large amount of inorganic flame-resistant filler. It appears that the ability to improve the flame-retardant properties of the filled silicone rubber is specific to the finely divided glass frit, since the use of other flame-retardant materials generally employed in applications requiring better flame-retardant properties are either not as effective in the silicone rubber for this purpose, or cannot take the curing temperatures required for the silicone rubber, or cannot advantageously be used in an application for the silicone rubber, or else adversely affect the properties of the cured silicone rubber.

In the specification and in the claims, the convertible organopolysiloxanes, which may be viscous masses or gummy solids, depending on the state of condensation, will hereinafter be referred to as "convertible organopolysiloxanes" or more specifically as "convertible methylpolysiloxanes." Although convertible organopolysiloxanes with which the present invention is concerned are now well-known in the art, for purposes of showing persons skilled in the art the various convertible organopolysiloxanes which may be employed in the practice of the present invention, attention is directed to the convertible organopolysiloxanes preferably containing less than 0.2 mol per cent (the heat-convertible organopolysiloxane is preferably free of any copolymerized monoorganosiloxane) copolymerized monoorganosiloxane disclosed and claimed in Agens Patent 2,448,756, issued September 7, 1948; in Sprung et al. Patent 2,448,556, issued September 7, 1948; and Sprung Patent 2,448,595, issued October 11, 1949; or in Krieble et al. Patent 2,457,688, issued December 28,1948— all the foregoing patents being assigned to the same assignee as the present invention, as well as in Warrick Patent 2,460,795. It will, of course, be understood by those skilled in the art that these convertible organopolysiloxanes may contain the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to the silicon atoms by carbon-silicon linkages. The particular convertible organopolysiloxane used in the practice of this invention is not critical and is advantageously obtained by condensing a diorganodihydrolyzable silane, for instance, dimethyldichlorosilane, mixtures of dimethyldichlorosilane and diphenyldichlorosilane, or mixtures of dimethyldichlorosilane and methylphenyldichlorosilane, etc. (with or without the presence of small amount of monoorganotrihydrolyzable silanes or triorganomonohydrolyzable silanes, e. g., methyltrichlorosilane, trimethylchlorosilane, etc.), and thereafter effecting condensation of the hydrolysis product using a condensing agent, for instance, an alkaline condensing agent such as potassium hydroxide, sodium hydroxide, etc., or an acidic condensing agent of the type such as ferric chloride, etc.

Generally, it is desirable that the convertible organopolysiloxane comprise the recurring structural unit RR'SiO where R and R' are monovalent hydrocarbon radicals, many examples of which have been given above, for instance, alkyl, aryl, aralkyl, alkaryl, halogenated aryl, etc., radicals. It is also desirable that in the convertible organopolysiloxane, the majority of the R and R' radicals be lower alkyl radicals, for instance, methyl radicals, and such dialkylsiloxy units comprise at least 50 per cent of the total number of organic groups bonded to the silicon atom by carbon-silicon linkages. It is usually preferred that the organopolysiloxanes from which the heat-curable organopolysiloxanes are prepared contain an average of from about 1.98 to about 2.2 organic groups, for instance, methyl groups, total methyl and phenyl groups, etc., per silicon atom, and that more than 98 per cent, for example, more than about 99.8 per cent, of the silicon atoms of the polysiloxane contain two silicon-bonded organic groups, for instance, alkyl groups, or a mixture of alkyl and aryl groups, etc., per silicon atom.

The glasses employed in the practice of the present invention are generally those commercially available on the market and have the additional property that they do not fuse at temperatures (e. g., below 300° C.) to which the convertible organopolysiloxane in the converted form will be subjected in normal usage. However, it is essential that the glass be fusible at the temperatures of open flames. Generally, it is desirable that the glass does not melt below 300° C. and preferably is first fusible, i. e., the individual particles in the glass frit first begin to coalesce or exhibit cohesion so as to form a glass agglomerate, at a temperature of the order of from about 450° to 850° C. or higher. At this fusion temperature in the presence of the flame, the fused glass should be fluid enough to froth as a result of the action thereon of the volatile gases released from the burning silicone rubber. Any of the glasses well known in the art may be employed without departing from the scope of the invention. In this connection, one may employ, for instance, various silica glasses comprising silica and various metallic oxides including sodium oxide, potassium oxide, lithium oxide, magnesium oxide, calcium oxide, aluminum oxide, etc. Examples of glasses which may be employed in the practice of the present invention may be found disclosed in the book "Properties of Glass" by George W. Morey, published by the Reinhold Publishing Corportion, 330 West 42nd Street, New York, New York (1938), pages 85, 170, and 171, in which cohesion (i. e., fusion) points, softening points and flow points of suitable glasses are given. Reference to other portions of the above-identified book by Morey will indicate to persons skilled in the art other types of glasses which may be employed in the practice of the present invention. As pointed out above, the type of glass used is not critical and it is only essential that it have a sufficiently low fusion or softening point which in the finely divided state will, it is believed, be caused to froth due to the action of the volatile gases on the melted glass, thus preventing further advance of the flame and thereby effecting extinguishment of the latter.

Generally, it is desirable that the glass employed in the finely ground state and for this purpose it is desirable to use a glass frit having an average particle size below about 15 microns. Although coarser particles of larger average particle sizes may be employed, it is generally desirable to keep the particle size as fine as possible in order to avoid any adverse effects on the properties of, for instance, coatings of the heat-convertible organopolysiloxane while the latter are being applied to various surfaces or after such coatings have been heat-treated in place. Glass floc or fibers are unsatisfactory because of their lack of desirable thermoresponsiveness and because of their lack of utility in coating applications for which the presently claimed compositions are admirably suitable.

In preparing the compositions herein defined, various fillers may be employed as, for instance, silica aerogel, calcium carbonate, diatomaceous earth, iron oxide, titanium dioxide, lithopone, etc. The amount of filler employed may be varied widely and may comprise, for instance, from about 25 to 300 per cent of the weight of the convertible organopolysiloxane. The exact amount of filler employed will depend upon the application for which the convertible organopolysiloxane is intended, the type of organopolysiloxane and filler employed, etc.

In order to accelerate the cure of the convertible organopolysiloxanes, it is desirable to add to the latter various curing agents, for example, benzoyl peroxide, tertiary butyl perbenzoate, etc. These curing agents may be present in various amounts ranging from about 0.1 to as high as 4 to 6 per cent, by weight, or more based on the weight of the convertible organopolysiloxane.

In making the compositions herein defined, particularly for coating purposes by which they may be coated on by either dipping, knifing, spraying, etc., it is not critical how this may be accomplished. Generally, it merely requires mixing in the usual apparatus, for instance, dough mixers, etc., or on rolls, the convertible organopolysiloxane, the filler, the ground glass, and the curing agent, and, if desired, making a mixture of these ingredients with a solvent for the convertible organopolysiloxane, for instance, toluene, benzene, xylene, etc., to a solids content of about 15 to 60 per cent solids. Alternatively, the mixture of convertible organopolysiloxane, filler, curing agent, and glass frit may be employed in coating applications without using any dispersing or solvent phase. This solution-dispersion mixture (in which the liquid phase is preferably a solvent for the organopolysiloxane) or liquid-free mixture can then be applied to various inorganic fibrous substrata such as, for instance, glass cloth, asbestos cloth, quartz fiber cloth, etc., in thin coats of, for example, 2 to 10 mils or more, and thereafter cured at temperatures ranging from about 125° to 175° C. for a time ranging from about 5 to 15 minutes. Thereafter, additional curing of the coated surfaces may be effected by further heat treatment at a temperature of the order of about 200 to 300° C. for a time ranging from about a few minutes to even several hours to effect complete conversion of the convertible organopolysiloxane to the substantially infusible and insoluble state.

In order that those skilled in the art may better understand how the present invention may be practiced, the following examples are given by way of illustration and not by way of limitation. All parts are by weight.

*Example 1*

A heat-curable, toluene-soluble organopolysiloxane was obtained by hydrolyzing essentially pure dimethyldichlorosilane, isolating the liquid polymer obtained as a result of this hydrolysis and condensing the liquid methylpolysiloxane with a condensing agent comprising a small amount of, for example, about 0.01 per cent KOH until a highly viscous mass bordering on a gummy solid was obtained. This product had a ratio of approximately two methyl groups per silicon atom. Three formulations were prepared in which various fillers were mixed with the above-prepared convertible methylpolysiloxane, finely divided glass frit of an average particle size of less than 15 microns and fusing at around 500° C., and a curing agent comprising benzoyl peroxide. The glass frit employed comprised a lithium silicate glass. These formulations were as follows:

| Formulation No. | Convertible Methylpolysiloxane | Filler | Glass Frit | Benzoyl Peroxide |
|---|---|---|---|---|
| $a_1$ | 100 | 100 | 15 | 2.5 |
| $b_2$ | 100 | 75 | 75 | 3.0 |
| $b_3$ | 100 | 100 | 15 | 3.0 |
| $c_4$ | 100 | 50 | 0 | 3.0 |
| $c_5$ | 100 | 50 | 15 | 3.0 |
| $c_6$ | 100 | 50 | 50 | 3.0 |
| $d_7$ | 100 | 45 | 0 | 1.45 |

NOTE:
 a—Filler was diatomaceous earth.
 b—Filler was $TiO_2$; formulation 2 used a partially polymerized hydrolysis product of dimethyldichlorosilane.
 c—Filler was calcium carbonate.
 d—Filler was silica aerogel.

Each of the above formulations was milled with an amount of toluene sufficient to form a solution-dispersion mixture containing about 50 to 55 per cent solids. Formulations 1 to 4, 6, and 7 were applied to glass cloth by knife-coating on one side the solution-dispersions thereon so that the initial thickness of the cloth was increased from 4 mils to an outside thickness of about 10 mils. Formulation 5 was applied to glass cloth by dip-coating the latter in the solution-dispersion so that the initial thickness of the 4-mil cloth was increased to a final thickness of 10 mils. Each of the treated cloths was then heated for about 10 minutes at 125° C. and thereafter given a further cure of about 15 minutes at 250° C. prior to testing in the manner described below. Each of the glass cloth samples treated with the above formulations was tested for flame-retardant properties in accordance with the Government specification found in Federal Government Federal Standard Stock Catalog published October 8, 1945, CCC–T–191a, section IV (part 5), Supplement to Federal Specification for Textiles; General Specification, Test Methods, section V—par. 1, "Fire Resistance." This test comprises applying a flame to a strip of the material being tested and thereafter withdrawing the flame and noting the length of time required before the flame extinguishes itself. It was found that the glass cloth coated with formulations 4 and 7 continued to burn after the flame was withdrawn, while the glass cloth treated with the other formulations was extinguished in from 3 to 10 seconds after the flame was withdrawn. The presence of the large amounts of glass frit did not harm the properties of the coated cloth, and in fact, the formulations using the larger amounts of glass frit appeared to improve the physical properties of the treated glass cloth.

The above flame-retardant properties of the silicone rubber-coated glass cloth are believed to be outstanding since Federal specifications for certain military supplies which are intended to be in direct contact with a high intensity call for extinguishment of the flame within 12 seconds.

It will, of course, be apparent to those skilled in the art that instead of using the particular organopolysiloxane described above, other organopolysiloxanes, many examples of which have been given above, may be employed without departing from the scope of the invention. In addition, other fillers and curing agents as well as other types of finely divided glass or glass frit, including glasses of higher or lower fusion or melting properties, may also be employed. The amount of glass frit employed may be varied widely but is advantageously within the ranges described above, and preferably ranges from about 5 to 50 per cent of the weight of the convertible organopolysiloxane.

The invention herein described may be used in applications which require resistance to extremely high temperatures at which ordinary silicone rubbers will ignite and continue to burn. In this connection, it may be employed in applications requiring resistance to extremely high temperatures such as heater ducts, protective insulation for various types of equipment such as wrap-around tapes for elements which may be subjected to elevated temperatures, etc. One particular application involves a flap to be employed in connection with tents which are intended to house stoves whose chimneys have exits through the top of the tent. Obviously, the usual tent material will not withstand the high temperatures immediately adjacent such chimneys. However, by inserting at this point a flap of glass cloth treated with the flame-retardant silicone rubber described in the present invention, it is possible to obviate the danger of fires, which may spread to the balance of the tent should the chimney of the stove become overheated for any reason.

What I claim as new and desire to secure by Letters Patent of the United States is:

1. A composition of matter having improved fire-retardant properties comprising a heat convertible organopolysiloxane in which the organic groups are selected from the class consisting of alkyl, aryl, aralkyl, and halogenated aryl radicals, the majority of the organic groups being alkyl radicals, a filler, and at least 5 per cent, by weight, of a finely divided, low-melting glass frit having a softening point above 300° C., based on the weight of the organopolysiloxane.

2. A composition of matter comprising a heat-convertible methylpolysiloxane, a filler, and a minor proportion of a finely divided, low-melting glass frit having a softening point above 300° C.

3. A composition of matter comprising (1) a methylpolysiloxane containing an average of from about 1.95 to 2.2 methyl groups per silicon atom and being convertible to a solid elastic substantially infusible and insoluble state by heat, (2) a filler, and (3) from 5 to 100 per cent, by weight, based on the weight of (1) of a finely divided, low-melting glass frit having a softening point above 300° C.

4. A composition as in claim 3 in which the filler is diatomaceous earth.

5. A composition as in claim 3 in which the filler is titanium dioxide.

6. A composition as in claim 3 in which the filler is calcium carbonate.

7. An article of manufacture comprising inorganic fibrous sheet material coated with a heat-converted composition of matter comprising prior to heating thereof (a) an organopolysiloxane convertible by heat to the solid, elastic, substantially infusible and insoluble state in which the organic groups are selected from the class consisting of alkyl, aryl, aralkyl, and halogenated aryl radicals, the majority of the organic groups being alkyl radicals, (b) a filler and (c) from 5 to 50 per cent, by weight, of a finely divided, low-melting glass frit having a softening point above 300° C., the weight of the latter being based on the weight of the organopolysiloxane.

8. An article of manufacture comprising glass cloth coated with a heat-converted composition of matter comprising prior to heating thereof (a) a methylpolysiloxane containing an average of from about 1.98 to 2.2 methyl groups per silicon atom and convertible by heat to the solid, elastic, substantially infusible and insoluble state, (b) a filler, and (c) from 5 to 100 per cent, by weight, based on the weight of the methylpolysiloxane, of a finely divided, low-melting glass frit having a softening point above 300° C.

9. An article of manufacture comprising glass cloth coated with a heat-converted composition of matter comprising prior to heating thereof (a) a methylpolysiloxane containing an average of from about 1.98 to 2.2 methyl groups per silicon atom and convertible by heat to the solid elastic substantially infusible and insoluble state, (b) a filler comprising diatomaceous earth, and (c) from 5 to 50 per cent, by weight, based on the weight of the methylpolysiloxane, of a finely divided, low-melting glass frit having a softening point above 300° C.

10. An article of manufacture comprising glass cloth coated with a heat-converted composition of matter comprising prior to heating thereof (a) a methylpolysiloxane containing an average of from about 1.98 to 2.2 methyl groups per silicon atom and convertible by heat to the solid elastic substantially infusible and insoluble state, (b) a filler comprising titanium dioxide, and (c) from 5 to 50 per cent, by weight, based on the weight of the methylpolysiloxane, of a finely divided low-melting glass frit having a softening point above 300° C.

11. An article of manufacture comprising glass cloth coated with a heat-converted composition of matter comprising prior to heating thereof (a) a methylpolysiloxane containing an average of from about 1.98 to 2.2 methyl groups per silicon atom and convertible by heat to the solid elastic substantially infusible and insoluble state, (b) a filler comprising calcium carbonate, and (c) from 5 to 50 per cent, by weight, based on the weight of the methylpolysiloxane, of a finely divided, low-melting glass frit having a softening point above 300° C.

12. A coating composition comprising (1) a methylpolysiloxane containing an average of from 1.98 to 2.2 methyl groups per silicon atom and being convertible by heat to the solid, elastic state, (2) a curing agent for (1) comprising benzoyl peroxide, (3) a filler, and (4) from 5 to 50 per cent based on the weight of (1), of a finely divided, low-melting glass frit having a softening point above 300° C,. the aforesaid coating composition being in the form of a solution-dispersion in which the liquid medium for said dispersion is also a solvent for the methylpolysiloxane.

No references cited.